(12) United States Patent
Qi et al.

(10) Patent No.: US 10,032,432 B2
(45) Date of Patent: Jul. 24, 2018

(54) METHOD, SYSTEM AND APPARATUS FOR TRANSMITTING INTELLIGENT INFORMATION

(71) Applicant: Hangzhou Hikvision Digital Technology Co., Ltd., Hangzhou (CN)

(72) Inventors: Jinhong Qi, Hangzhou (CN); Tian Huang, Hangzhou (CN); Hai Yu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/128,369

(22) PCT Filed: Jan. 16, 2015

(86) PCT No.: PCT/CN2015/070826
§ 371 (c)(1),
(2) Date: Sep. 22, 2016

(87) PCT Pub. No.: WO2015/143935
PCT Pub. Date: Oct. 1, 2015

(65) Prior Publication Data
US 2017/0103727 A1    Apr. 13, 2017

(30) Foreign Application Priority Data

Mar. 28, 2014 (CN) .......................... 2014 1 0121445

(51) Int. Cl.
*H04N 7/12* (2006.01)
*G09G 5/00* (2006.01)

(52) U.S. Cl.
CPC ......... *G09G 5/006* (2013.01); *G09G 2358/00* (2013.01); *G09G 2360/18* (2013.01); *G09G 2370/00* (2013.01)

(58) Field of Classification Search
CPC ............... G09G 5/006; G09G 2358/00; G09G 2360/18; G09G 2370/00
See application file for complete search history.

(56) References Cited

U.S. PATENT DOCUMENTS 6,965,601 B1 *  11/2005  Nakano ............ H04N 21/23602
                                                            348/461
7,012,964 B1 *  3/2006  Nakano ................ H04N 9/8042
                                                            375/240.28

(Continued)

FOREIGN PATENT DOCUMENTS

CN    101146177 A    3/2008
CN    101303761 A    11/2008

(Continued)

OTHER PUBLICATIONS

Chinese Office Action for Application No. 201410121445.5 dated May 8, 2017.

(Continued)

*Primary Examiner* — Paulos M Natnael
*Assistant Examiner* — Humam Satti
(74) *Attorney, Agent, or Firm* — Harness, Dickey & Pierce, P.L.C.

(57) ABSTRACT

Embodiments of the present disclosures provide a method, system and apparatus for transmitting intelligent information. When one frame of video data x is to be transmitted, a SDI sending terminal determines whether there is intelligent information satisfying a transmission condition; the transmission condition comprising that intelligent information is not transmitted and transmission of a frame of video data corresponding to the intelligent information is finished. If there is the intelligent information satisfying the transmission condition, the SDI sending terminal adds intelligent information y being one item of the intelligent information satisfying the transmission condition into a preset position of (Continued)

the video data x; and transmits the video data x having the intelligent information y. By using the solutions of the present disclosures, implementation costs are reduced and security is improved.

11 Claims, 3 Drawing Sheets

(56) References Cited

U.S. PATENT DOCUMENTS

| | | | | |
|---|---|---|---|---|
| 7,336,681 | B1* | 2/2008 | Wilkinson | H04N 21/235 370/471 |
| 8,135,261 | B1* | 3/2012 | Black | H04N 9/8205 386/239 |
| 8,879,895 | B1* | 11/2014 | Bussieres | H04N 5/76 369/4 |
| 9,185,321 | B1* | 11/2015 | Laframboise | H04N 5/272 |
| 9,769,417 | B1* | 9/2017 | Yarygin | H04N 7/0884 |
| 2001/0017593 | A1* | 8/2001 | Saunders | H04N 5/222 341/50 |
| 2002/0164149 | A1* | 11/2002 | Wilkinson | H04N 7/181 386/230 |
| 2004/0156505 | A1 | 8/2004 | Yanagita | |
| 2006/0251112 | A1* | 11/2006 | Sato | H04N 21/4382 370/465 |
| 2008/0144664 | A1 | 6/2008 | Wilkinson | |
| 2009/0313669 | A1* | 12/2009 | Boudani | H04N 21/23602 725/109 |
| 2010/0046554 | A1* | 2/2010 | Wilkinson | H04N 21/235 370/474 |
| 2010/0183278 | A1* | 7/2010 | Black | G11B 27/034 386/278 |
| 2012/0249787 | A1 | 10/2012 | Allegra et al. | |
| 2013/0208812 | A1* | 8/2013 | Hudson | H04N 21/23602 375/240.26 |

FOREIGN PATENT DOCUMENTS

| | | |
|---|---|---|
| CN | 101420585 A | 4/2009 |
| CN | 103354607 A | 10/2013 |
| WO | 2012/033758 A2 | 3/2012 |

OTHER PUBLICATIONS

International Search Report for PCT/CN2015/070826, ISA/CN, Haidian District, Beijing, dated May 4, 2015,
Chinese Office Action for Application No. 201410121445.5 dated Oct. 23, 2017, and an English concise explanation of relevance thereof.
Extended European Search Report for Application No. 15769626.1 dated Nov. 13, 2017.

* cited by examiner

METHOD, SYSTEM AND APPARATUS FOR TRANSMITTING INTELLIGENT INFORMATION

CROSS-REFERENCE TO RELATED APPLICATIONS

This application is a 371 U.S. National Stage of International Application No. PCT/CN2015/070826, filed Jan. 16, 2015, which claims the benefit of and priority to Chinese Patent Application No. 201410121445.5, filed Mar. 28, 2014. The entire disclosures of the above applications are incorporated herein by reference.

TECHNICAL FIELD

The present disclosure relates to intelligent traffic technologies, and more particularly, to a method, system and apparatus for transmitting intelligent information.

BACKGROUND

Conventional intelligent transportation integrated machines have functions of collecting and generating video data, i.e. image data, and also have functions of generating intelligent information by using integrated intelligent algorithm. The intelligent information may include license plate information, vehicle characteristics, such as car body colors, models, and illegal type etc.

The video data are transmitted to a terminal server via a Serial Digital Interface (SDI), and the intelligent information is transmitted to the terminal server via an IP network.

SUMMARY

Embodiments of the present disclosures provide a method, system and apparatus for transmitting intelligent information, so as to reduce implementation costs and improve security.

The technical solutions of the present disclosures may be implemented as follows.

A method for transmitting intelligent information includes:

determining, by a SDI sending terminal, whether there is intelligent information satisfying a transmission condition, when one frame of video data x is to be transmitted; the transmission condition comprising that intelligent information is not transmitted and transmission of a frame of video data corresponding to the intelligent information is finished;

if there is the intelligent information satisfying the transmission condition, adding, by the SDI sending terminal, intelligent information y being one item of the intelligent information satisfying the transmission condition into a preset position of the video data x; and transmitting, by the SDI sending terminal, the video data x having the intelligent information y.

A system for transmitting intelligent information includes:

a SDI sending terminal, to determine whether there is intelligent information satisfying a transmission condition when one frame of video data x is to be transmitted; the transmission condition comprising that intelligent information is not transmitted and transmission of a frame of video data corresponding to the intelligent information is finished; if there is the intelligent information satisfying the transmission condition, add intelligent information y being one item of the intelligent information satisfying the transmission condition into a preset position of the video data x, and transmit the video data x having the intelligent information y.

An apparatus for transmitting intelligent information includes:

a first processing module, to determine whether there is intelligent information satisfying a transmission condition when one frame of video data x is to be transmitted; the transmission condition comprising that intelligent information is not transmitted and transmission of a frame of video data corresponding to the intelligent information is finished; and trigger a second processing module if there is the intelligent information satisfying the transmission condition;

the second processing module, to add intelligent information y being one item of the intelligent information satisfying the transmission condition into a preset position of the video data x, and transmit the video data x having the intelligent information y, after being triggered.

As can be seen, by using the solutions of the present disclosures, the intelligent information is transmitted after being added into the video data, i.e. the intelligent information is transmitted based on the SDI. Therefore, existing coaxial lines may be used and it is unnecessary to lay the IP network, so that implementation costs are reduced. In addition, the security of the SDI is higher than the IP network because the SDI is relatively closed, and thus the security of the intelligent information is improved.

DETAILED DESCRIPTION

According to conventional modes, it is necessary to lay an IP network, and costs are relatively high. In addition, if the intelligent transportation integrated machines are exposed in the IP network, the security is bad.

Embodiments of the present disclosures provide solutions for transmitting intelligent information, so as to reduce implementation costs and improve security.

In order to make the technical solutions of the present disclosure clearer, the present disclosure will be illustrated in detail hereinafter with reference to the accompanying drawings and specific examples.

Figure 1:
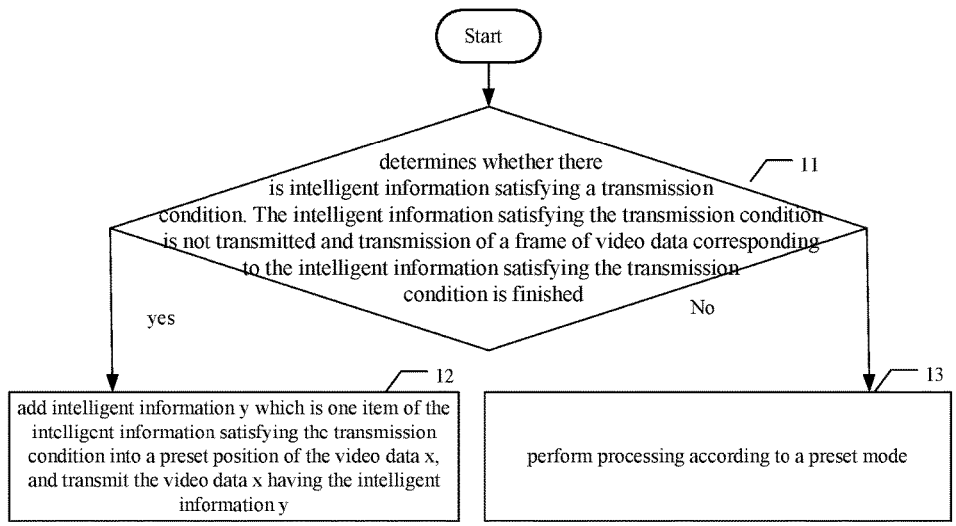
FIG. 1 is a schematic flowchart illustrating a method for transmitting intelligent information according to various examples of the present disclosure.

FIG. 1 is a schematic flowchart illustrating a method for transmitting intelligent information according to various examples of the present disclosure. As shown in FIG. 1, the method includes the following processing.

At 11, each time when one frame of video data x is to be transmitted, a SDI sending terminal determines whether there is intelligent information satisfying a transmission condition. The intelligent information satisfying the transmission condition is not transmitted and transmission of a frame of video data corresponding to the intelligent information satisfying the transmission condition is finished. If there is the intelligent information satisfying the transmission condition, processing at 12 is performed; if there is no intelligent information satisfying the transmission condition, processing at 13 is performed.

The video data are transmitted via an SDI sending terminal by taking one frame as a unit. The SDI sending terminal may be an intelligent transportation integrated machine.

In the solutions of the present disclosure, it is ensured that the transmission of the intelligent information corresponding to the frame of video data lags behind that of the frame of video data, that is, the frame of video data is transmitted first, and then the intelligent information corresponding to the frame of video data is transmitted.

Hence, if the intelligent information is not transmitted and transmission of the frame of video data corresponding to the intelligent information is finished, the intelligent information is the intelligent information satisfying the transmission condition.

The number of items of the intelligent information satisfying the transmission condition may be zero, one or more than one. If there is one or more items of the intelligent information satisfying the transmission condition, the processing at 12 is performed; otherwise, the processing at 13 is performed.

At 12, the SDI sending terminal adds intelligent information y which is one item of the intelligent information satisfying the transmission condition into a preset position of the video data x, and transmits the video data x having the intelligent information y.

If there is only one item of intelligent information satisfying the transmission condition, the item of intelligent information is added into the preset position of the video data x. If there are more than one items of intelligent information satisfying the transmission condition, one item of intelligent information may be selected and added into the preset position of the video data x. How to select the item of intelligent information is not limited in the present disclosures. For example, an item of intelligent information corresponding to video data transmitted first may be selected.

For ease of expression, in the current and subsequent embodiments, video data x is used to indicate any one frame of video data to be transmitted, and intelligent information y is used to indicated one item of intelligent information added into the video data x.

According to SDI protocol standards, the maximum frequency supported by the SDI is 3.0G, the maximum resolution is 1920×1080, and lossless audio and video transmission are supported.

Figure 2:
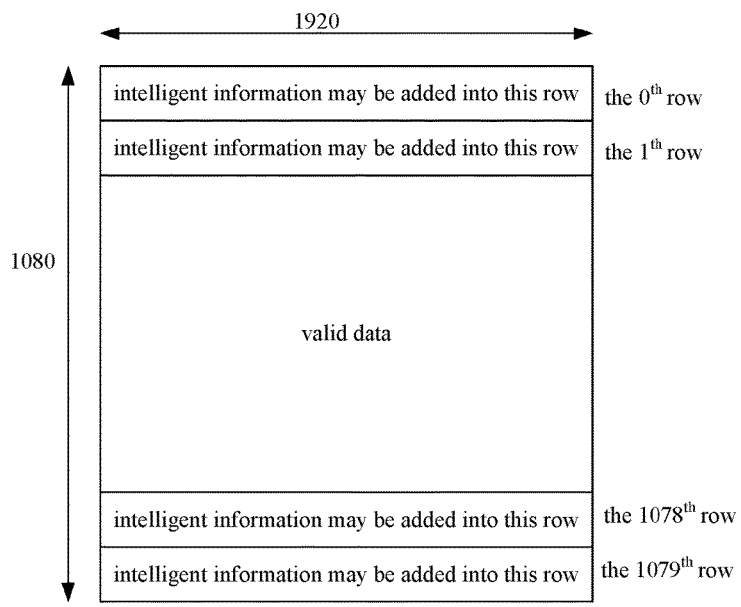
FIG. 2 is a schematic diagram illustrating first two rows and last two rows of valid data in video data X according to various examples of the present disclosure.

In an embodiment, the position of the video data x into which the intelligent information y is added may be first two rows of valid data in the video data x, last two rows of the valid data in the video data x, or a frame blanking row of the video data x. The frame blanking row refers to a row including transition data generated when a frame of video data jumps to a next frame of video data, and the rows of valid data refers to remain video data rows except the frame blanking row. FIG. 2 is a schematic diagram illustrating first two rows and last two rows of valid data in video data X according to various examples of the present disclosure.

In an embodiment, the intelligent information y may be added into the preset position of the video data x by using a mode of Header+Payload.

The Header may include a TIME_STAMP_V field, a TIME_STAMP_I field and a V field. The TIME_STAMP_V field carries a time stamp of the video data x, the TIME_STAMP_I field carries a time stamp of video data corresponding to the intelligent information y, and the V field carries an identifier indicating that contents in the Payload is valid. The Payload carries the intelligent information y.

In practical applications, the Header may further include a PAYLOAD_LENGTH field, a REV field, a VMAIN, a VSUB and a VMOD field.

The PAYLOAD_LENGTH field carries length information of the intelligent information y and 32 bytes are taken as a unit. If the length of the intelligent information y is 32 bytes, the record in the field is 1, and if the length of the intelligent information y is 64 bytes, the record in the field is 2. The REV field is a reserved field for flexible extension. The VMAIN field, the VSUB field and the VMOD field are used to distinguish intelligent information of different versions.

In an embodiment, the intelligent information may be encapsulated into a Payload of an intelligent information element, and the intelligent information element may be added into the preset position of the video data x.

The intelligent information element includes a Header and the Payload. Contents of the Header and the Payload are the same as the Header and Payload of the intelligent information y respectively, and will not be described herein.

Figures 3, 4:
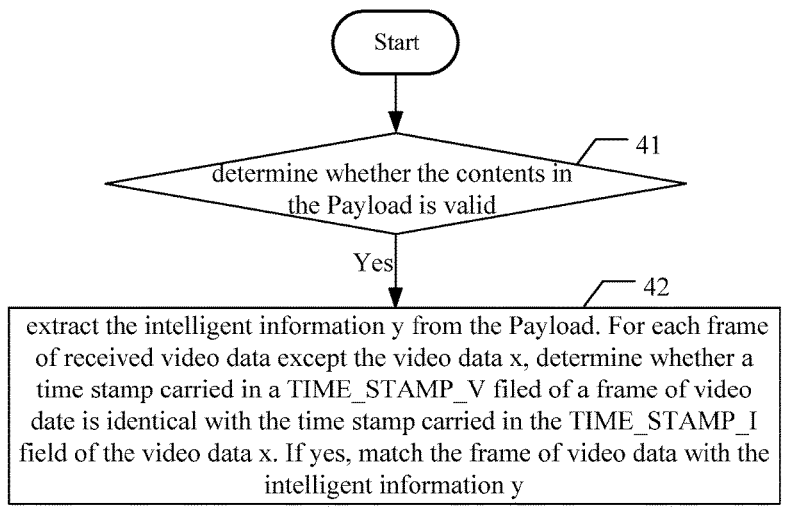
FIG. 3 is a schematic diagram illustrating a Header according to various examples of the present disclosure.
FIG. 4 is a schematic flowchart illustrating a method for transmitting intelligent information according to various examples of the present disclosure.

FIG. 3 is a schematic diagram illustrating a Header according to various examples of the present disclosure. As shown in FIG. 3, the size of the Header may be 128 bytes, and the size of each field is shown. Generally, the largest size of Payload is 512 bytes.

Theoretically, 1920×2 bytes of intelligent information may be added into each row shown in FIG. 2. Generally, one row may be occupied to add intelligent information y, e.g. the $0^{th}$ row shown in FIG. 2. If the intelligent information y is relatively large and one row is not enough, two rows may be occupied, e.g. the $0^{th}$ and $1^{th}$ rows shown in FIG. 2.

At 13, the SDI sending terminal performs processing according to a preset mode.

In an embodiment, if it is determined that no intelligent information satisfies the transmission condition at 12, processing may be performed according to the following preset mode. The time stamp of the video data x is carried in the TIME_STAMP_V field shown in FIG. 3, an identifier indicating that the contents in the Payload is invalid is carried in the V filed, the Payload may be null or carry data originally supposed to transmitted, e.g. video data. Information carried by other fields is not limited.

In an embodiment, in the V filed, the identifier indicating that the contents in the Payload is invalid may be 0, and the identifier indicating that the contents in the Payload is valid may be 1.

The processing at the SDI sending terminal is described above, and processing at a SDI receiving terminal may be described hereinafter. In an embodiment, the SDI receiving terminal may be a terminal server and so on.

After receiving the video data x, the SDI receiving terminal may perform the following processing.

At 41, the SDI receiving terminal determines whether the contents in the Payload is valid according to the identifier carried by the V field of the video data x. if the contents in the Payload is valid, processing at 42 is performed, and if the contents in the Payload is invalid, processing may be performed according a preset mode which is not limited.

At 42, the SDI receiving terminal extracts the intelligent information y from the Payload. For each frame of received video data except the video data x, the SDI receiving terminal determines whether a time stamp carried in a TIME_STAMP_V filed of a frame of video date is identical with the time stamp carried in the TIME_STAMP_I field of the video data x. if the time stamp carried in the TIME_STAMP_V filed of the frame of video date is identical with the time stamp carried in the TIME_STAMP_I field of the video data x, the SDI receiving terminal matches the frame of video data with the intelligent information y.

When the frame of video data is matched with the intelligent information y, the intelligent information y and the video data corresponding to the intelligent information are synchronized at the SDI receiving terminal.

In an embodiment, the intelligent information y may be extracted from the Payload, and each frame of received video data except the video data x are searched for a frame of video data, a time stamp carried in a TIME_STAMP_V field of the frame of video data to be found is identical with the time stamp carried by the TIME_STAMP_I filed of the video data x. If the frame of video data is found, the found frame of video data is matched with the intelligent information y.

In practical applications, a buffer pool may be configured in advance, so as to improve process efficiency. After receiving the video data x, the SDI receiving terminal may add the video data x into the buffer pool, and then determine whether the contents in the Payload are valid according to the identifier carried in the V field of the video data x. For example, if the identifier is 1, the contents in the Payload are valid. If the contents in the Payload are valid, for each frame of video data stored in the buffer pool except the video data x, the SDI receiving terminal may determine whether the time stamp carried by the TIME_STAMP_V field of the frame of video data is identical with the time stamp carried by the TIME_STAMP_I filed of the video data x. If the time stamp carried by the TIME_STAMP_V field of the frame of video data is identical with the time stamp carried by the TIME_STAMP_I filed of the video data x, the frame of video data is matched with the intelligent information y, and the frame of video data is cancelled from the buffer pool.

When the buffer pool is full, a frame of video data having an earliest time stamp carried in the TIME_STAMP_V field, i.e. a first received video data, may be cancelled.

The size of the buffer pool may be determined according to practical requirements. Generally, the buffer pool is not too small to prevent that a frame of video data matched with the intelligent information y has been cancelled when matching operation is performed for the intelligent information y.

It should be noted that, in the solutions of the present disclosures, the SDI sending terminal and the SDI receiving terminal need to configure the position for adding the intelligent information y in advance, so that the SDI sending terminal and the SDI receiving terminal obtain the same position for adding the intelligent information y, and thus the intelligent information may be received correctly.

The processing at the SDI sending terminal and at the SDI receiving terminal are described above, and a method of the present disclosure may include the following processing.

Preprocessing and post-processing may be performed.

In an internal synchronization mode, the SDI sending terminal cannot transmit special data, e.g. 0x00 and 0xff. In order to prevent that 0x00 or 0xff are included in the intelligent information y, the following processing may be performed before transmitting the video data x having the intelligent information y. The SDI sending terminal splits each byte of the intelligent information y into two bytes by performing bit operation, and the two bytes are transmitted adjacently.

In an embodiment, by using a bit operation digit a ($1<a<7$), 8 bits of each byte is split into a bit and ($8-a$) bit, and two bytes are generated after performing an or operation with 0x80. Different two bytes are generated when the value of a are different.

That is, $B0=((A|(\sim(0xff<<a)))|0x80)$ and $B1=((A>>a)|0x80)$ are calculated respectively. Herein, A represents any one byte of the intelligent information y to be split, B0 and B1 represent two bytes obtained after A is split, | represents a by bit or operation, $\sim$ represents a reverse operation, $<<$ represents a left shift $>>$ represents a right shift.

A=0xff is taken as an example, for different values of a, the obtained B0 and B1 are shown in table 1.

TABLE 1

B0 and B1 corresponding to different values of a

| a | B0 | B1 |
|---|------|------|
| 2 | 0x83 | 0xbf |
| 3 | 0x8e | 0x9f |
| 4 | 0x8f | 0x8f |
| 5 | 0x9f | 0x8e |
| 6 | 0xbf | 0x83 |

Correspondingly, the following processing may be performed at the SDI receiving terminal after the intelligent information y is extracted from the Payload. Each byte of the intelligent information y is restored by using a reverse operation of the bit operation.

That is, A is restored by $A=(B1<<a)|(B0\&(\sim(0xff<<a)))$. Herein, & represent a by bit and operation.

Error correction may be performed.

Because the SDI transmission is one-way transmission, the SDI receiving terminal cannot request the transmission again once a fault occurs in the transmission. For the purpose of error correction and improving success rate of the data transmission, the following processing is performed by the SDI sending terminal before transmitting the video data x having the intelligent information y. M copies of the intelligent information y are obtained, M is even, and the Payload carrying M+1 copies of the intelligent information y are transmitted.

In an embodiment, after extracting the intelligent information y from the Payload, the SDI receiving terminal determines whether the extracted M+1 copies of the intelligent information y are the same. If the extracted M+1 copies of the intelligent information y are the same, the subsequent processing is performed. If the extracted M+1 copies of the intelligent information y are different from each other, the M+1 copies of the intelligent information y are all discarded, and the processing is finished. If m copies of the intelligent information y are the same, m is larger than (M+1)/2 and is smaller than M+1, M+1−m copies of the intelligent information y which are different from the m copies of the intelligent information y are discarded, and the subsequent processing is performed.

In another embodiment, after extracting the intelligent information y from the Payload, the SDI receiving terminal performs the following processing. When m copies of the intelligent information y are the same, if m is equal to (M+1), the subsequent processing is performed. If m is larger than (M+1)/2 and is smaller than M+1, M+1−m copies of the intelligent information y which are different from the m copies of the intelligent information y are discarded. If m is smaller than (M+1)/2, the M+1 copies of the intelligent information y are all discarded.

The value of M may be configured according practical requirements. In an embodiment, the value of M is 2. If there are two copies of the intelligent information y are the same in three copies of the intelligent information y, one copy of the intelligent information y which is different is discarded.

The error correction at the SDI sending terminal may be performed before or after the preprocessing, and the error correction at the SDI receiving terminal may be performed before or after the post-processing.

Figure 5:
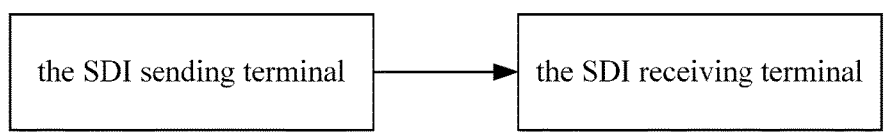
FIG. 5 is a schematic diagram illustrating a system for transmitting intelligent information according to various examples of the present disclosure.

FIG. 5 is a schematic diagram illustrating a system for transmitting intelligent information according to various examples of the present disclosure. As shown in FIG. 5, the system includes a SDI sending terminal.

When one frame of video data x is to be transmitted, a SDI sending terminal determines whether there is intelligent information satisfying a transmission condition. The transmission condition includes that intelligent information is not transmitted and transmission of a frame of video data corresponding to the intelligent information is finished. If there is the intelligent information satisfying the transmission condition, the SDI sending terminal adds intelligent information y which is one item of the intelligent information satisfying the transmission condition into a preset position of the video data x, and transmits the video data x having the intelligent information y.

The preset position may be first two rows of valid data in the video data x; last two rows of the valid data in the video data x; or a frame blanking row of the video data x.

The SDI sending terminal may add the intelligent information y into the preset position of the video data x by using a mode of Header+Payload.

The Header may include a TIME_STAMP_V field, a TIME_STAMP_I field and a V field. The TIME_STAMP_V field carries a time stamp of the video data x, the TIME_STAMP_I field carries a time stamp of video data corresponding to the intelligent information y, and the V field carries an identifier indicating that contents in the Payload is valid. The Payload carries the intelligent information y.

In an embodiment, the SDI sending terminal encapsulates the intelligent information y into a Payload of an intelligent information element, and then adds the intelligent information element into the preset position of the video data x. The intelligent information element includes a Header and the Payload. Contents of the Header and the Payload are the same as the Header and Payload of the intelligent information y respectively, and will not be described herein.

The system shown in FIG. 5 may further include a SDI receiving terminal.

After receiving the video data x, the SDI receiving terminal determines whether the contents in the Payload are valid according to the identifier carried by the V field of the video data x. If the contents in the Payload are valid, the SDI receiving terminal extracts the intelligent information y from the Payload. For each frame of received video data except the video data x, the SDI receiving terminal determines whether a time stamp carried in a TIME_STAMP_V filed of a frame of video date is identical with the time stamp carried in the TIME_STAMP_I field of the video data x. if the time stamp carried in the TIME_STAMP_V filed of the frame of video date is identical with the time stamp carried in the TIME_STAMP_I field of the video data x, the SDI receiving terminal matches the frame of video data with the intelligent information y.

In an embodiment, the SDI receiving terminal determines whether the contents in the Payload is valid according to the identifier carried in the V field of the video data x. If the contents in the Payload are valid, the SDI receiving terminal extracts the intelligent information y from the Payload. The SDI receiving terminal searches each frame of received video data except the video data x for a frame of video data, a time stamp carried in a TIME_STAMP_V field of this frame of video data is identical with the time stamp carried by the TIME_STAMP_I filed of the video data x. If the frame of video data is found, the SDI receiving terminal matches the frame of video data with the intelligent information y.

In addition, before transmitting the video x having the intelligent information y, the SDI sending terminal may further split each byte of the intelligent information y into two bytes by performing a bit operation, and transmit the two bytes adjacently.

The SDI sending terminal is user to split each byte of the intelligent information y into two bytes by performing a bit operation, and transmit the two bytes adjacently.

Correspondingly, after the intelligent information y is extracted from the Payload, the SDI receiving terminal may further restore each byte of the intelligent information y by using a reverse operation of the bit operation.

In an embodiment, the bit operation includes calculating B0=((A|(~(0xff<<a)))|0x80) and B1=((A>>a)|0x80). Herein, A represents any one byte of the intelligent information y to be split, B0 and B1 represent two bytes obtained after A is split, | represents a by bit or operation, ~ represents a reverse operation, << represents a left shift >> represents a right shift.

The reverse operation of the bit operation includes calculating A=(B1<<a)|(B0&(~(0xff<<a))). Herein, & represents a by bit and operation.

Before transmitting the video data x having the intelligent information y, the SDI sending terminal may further obtain M copies of the intelligent information y, M is even, and transmit the Payload carrying M+1 copies of the intelligent information y.

Correspondingly, after extracting the intelligent information y from the Payload, the SDI receiving terminal may further determine whether the extracted M+1 copies of the intelligent information y are the same. If the extracted M+1 copies of the intelligent information y are the same, the subsequent processing is performed. If the extracted M+1 copies of the intelligent information y are different from each other, the M+1 copies of the intelligent information y are all discarded, and the processing is finished. If m copies of the intelligent information y are the same, m is larger than (M+1)/2 and is smaller than M+1, M+1−m copies of the intelligent information y which are different from the m copies of the intelligent information y are discarded, and the subsequent processing is performed.

In another embodiment, after extracting the intelligent information y from the Payload and m copies of the intelligent information y are the same, the SDI receiving terminal is further used to perform subsequent processing if m is equal to (M+1), discard M+1−m copies of the intelligent information y which are different from the m copies of the intelligent information y if m is larger than (M+1)/2 and is smaller than M+1, or discard all copies of the intelligent information y if m is smaller than (M+1)/2.

Figure 6:
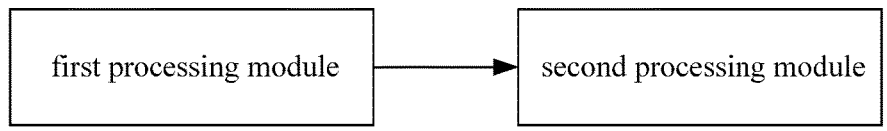
FIG. 6 is a schematic diagram illustrating an apparatus for transmitting intelligent information according to various examples of the present disclosure.

FIG. 6 is a schematic diagram illustrating an apparatus for transmitting intelligent information according to various examples of the present disclosure. As shown in FIG. 6, the apparatus includes storage and a processor. According to an example, the storage may be non-transitory computer readable storage medium. The storage stores computer readable instructions for implementing a first processing module and a second processing module. The processor may execute the computer readable instructions stored in the storage.

The first processing module is used to determine whether there is intelligent information satisfying a transmission condition when one frame of video data x is to be transmitted. The transmission condition includes that intelligent information is not transmitted and transmission of a frame of video data corresponding to the intelligent information is finished. If there is the intelligent information satisfying the transmission condition, the first processing module is used to trigger a second processing module.

The second processing module is used to add intelligent information y being one item of the intelligent information satisfying the transmission condition into a preset position of the video data x, and transmit the video data x having the intelligent information y, after being triggered.

The preset position of the video data x may be first two rows of valid data in the video data x; last two rows of the valid data in the video data x; or a frame blanking row of the video data x.

According to the above description of embodiments, it can be clearly understood by those skilled in the art that the present disclosures can be realized by software accompanying with necessary general hardware platforms, or by hardware. In many cases, the former is a preferred manner. Based on this, the essential part of the technical solution of the present disclosures or the part contributed to the prior art can be in the form of a software product, and the computer software product is stored in a non-transitory storage medium and includes several codes to make a computer device (such as a personal computer, a server or a network device) perform the method in embodiments of the present disclosures.

It should be understood that the above description just displays preferred examples of the present disclosure and is in no way intended to limit the scope of the present disclosure. Any modifications, equivalents, improvements and the like made within the spirit and principle of the present disclosure should be encompassed in the scope of the present disclosure.

The invention claimed is:

1. A method for transmitting intelligent information, comprising:
   determining, by a Serial Digital Interface (SDI) sending terminal, whether there is intelligent information satisfying a transmission condition, wherein when one frame of video data x is to be transmitted, the intelligent information satisfying the transmission condition is not transmitted, and a frame of video data corresponding to the intelligent information satisfying the transmission condition is transmitted before the intelligent information;
   if there is the intelligent information satisfying the transmission condition, adding, by the SDI sending terminal, selected intelligent information y of the intelligent information satisfying the transmission condition into a preset position of the video data x, wherein selected intelligent information y corresponds to video data x that has already been transmitted; and
   transmitting, by the SDI sending terminal, the video data x having the intelligent information y;
   wherein adding the intelligent information y into the preset position of the video data x comprises:
   encapsulating the intelligent information y into a Payload of an intelligent information element; and
   adding the intelligent information element into the preset position of the video data x;
   wherein the intelligent information element includes a Header and the Payload, the Header including a TIME_STAMP_V field, a TIME_STAMP_I field and a V field, the TIME_STAMP_V field carrying a time stamp of the video data x, the TIME_STAMP_I field carrying a time stamp of video data corresponding to the intelligent information y, the V field carries an identifier indicating that contents in the Payload is valid, the Payload carrying the intelligent information y; and
   if there is no intelligent information satisfying the transmission condition, the TIME_STAMP_V field carries a time stamp of the video data x, the V field carries an identifier indicating that contents in the Payload is invalid; and
   determining, by a SDI receiving terminal, whether the contents in the Payload are valid according to the identifier carried by the V field of the video data x, after receiving the video data x;
   extracting, by the SDI receiving terminal, the intelligent information y from the Payload if the contents in the Payload are valid;
   searching, by the SDI receiving terminal, each frame of received video data except the video data x for a frame of video data, a time stamp carried in a TIME_STAMP_V field of the frame of video data being identical with the time stamp carried by the TIME_STAMP_I field of the video data x; and
   matching, by the SDI receiving terminal, the frame of video data with the intelligent information y, if the frame of video data is found.

2. The method of claim 1, wherein the preset position of the video data x comprises:
   first two rows of valid data in the video data x; last two rows of valid data in the video data x; or a frame blanking row of the video data x.

3. The method of claim 1, further comprising:
   adding the video data x into a buffer pool configured in advance, before determining whether the contents in the Payload is valid according to the identifier carried by the V field of the video data x; and
   cancelling the frame of video data from the buffer pool, after matching the frame of video data with the intelligent information y;
   wherein each frame of the received video data except the video data x comprises: each frame of video data stored in the buffer pool except the video data x.

4. The method of claim 1, further comprising:
   splitting, by the SDI sending terminal, each byte of the intelligent information y into two bytes by performing a bit operation, before transmitting the video data x having the intelligent information y; and the two bytes being transmitted adjacently when the byte of the intelligent information y needs to be transmitted; and
   restoring, by the SDI receiving terminal, each byte of the intelligent information y by using a reverse operation of the bit operation, after extracting the intelligent information y from the Payload.

5. The method of claim 4, wherein the bit operation comprises:

calculating $B0=((A|(\sim(0xff<<a)))|0x80)$ and $B1=((A>>a)|0x80)$;

wherein A represents one byte of the intelligent information y to be split, B0 and B1 represent two bytes obtained after A is split, | represents a by bit or operation, ~ represents a reverse operation, << represents a left shift and >> represents a right shift;
wherein the reverse operation of the bit operation includes:

calculating $A=(B1<<a)|(B0\&(\sim(0xff<<a)))$; wherein & represents a by bit and operation.

6. The method of claim 1, wherein transmitting the video data x having the intelligent information y comprises:
obtaining M copies of the intelligent information y, M being even;
transmitting the Payload carrying M+1 copies of the intelligent information y; and
after extracting the intelligent information y from the Payload, the method further comprises:
when m copies of the intelligent information y are the same,
performing subsequent processing if m is equal to (M+1);
discarding M+1−m copies of the intelligent information y which are different from the m copies of the intelligent information y, if m is larger than (M+1)/2 and is smaller than M+1; and
discarding all copies of the intelligent information y, if m is smaller than (M+1)/2.

7. A system for transmitting intelligent information, comprising:
a SDI sending terminal configured to determine whether there is intelligent information satisfying a transmission condition, wherein when one frame of video data x is to be transmitted, the intelligent information satisfying the transmission condition is not transmitted, and a frame of video data corresponding to the intelligent information satisfying the transmission condition is transmitted before the intelligent information satisfying the transmission condition; if the intelligent information satisfies the transmission condition, selected intelligent information y of the intelligent information satisfying the transmission condition is added into a preset position of the video data x, the video data x having the intelligent information y is transmitted;
wherein the SDI sending terminal is configured to encapsulate the intelligent information y into a Payload of an intelligent information element, and add the intelligent information element into the preset position of the video data x;
wherein the intelligent information element includes a Header and the Payload, the Header includes a TIME_STAMP_V field, a TIME_STAMP_I field and a V field; the TIME_STAMP_V field carrying a time stamp of the video data x, the TIME_STAMP_I field carrying a time stamp of video data corresponding to the intelligent information y, the V field carries an identifier indicating that contents in the Payload is valid; the Payload carries the intelligent information y; and a SDI receiving terminal to determine whether the contents in the Payload is valid according to the identifier carried by the V field of the video data x, after receiving the video data x, extract the intelligent information y from the Payload if the contents in the Payload is valid, search each frame of received video data except the video data x for a frame of video data, a time stamp carried in a TIME_STAMP_V field of the frame of video data being identical with the time stamp carried by the TIME_STAMP_I field of the video data x, any match the frame of video data with the intelligent information y, if the frame of video data is found.

8. The system of claim 7, wherein the preset position of the video data x comprises:
first two rows of valid data in the video data x; last two rows of valid data in the video data x; or a frame blanking row of the video data x.

9. The system of claim 7, wherein
the SDI sending terminal splits each byte of the intelligent information y into two bytes by performing bit operation before transmitting the video x having the intelligent information y, and the two bytes being transmitted adjacently when the byte of the intelligent information y needs to be transmitted; and
the SDI receiving terminal further restores each byte of the intelligent information y by using a reverse operation of the bit operation, after extracting the intelligent information y from the Payload.

10. The system of claim 9, wherein the bit operation comprises:

calculating $B0=((A|(\sim(0xff<<a)))|0x80)$ and $B1=((A>>a)|0x80)$, wherein A represents one byte of the intelligent information y to be split, B0 and B1 represent two bytes obtained after A is split, | represents by bit or operation, ~ represents reverse operation, << represents left shift and >> represents right shift; and
wherein the reverse operation of the bit operation comprises:

calculating $A=(B1<<a)|(B0\&(\sim(0xff<<a)))$; wherein & represents by bit and operation.

11. The system of claim 7, wherein
the SDI sending terminal further obtains M copies of the intelligent information y, M being even; and transmit the Payload carrying M+1 copies of the intelligent information y when transmitting the video data x having the intelligent information y; and
the SDI receiving terminal further performs, after extracting the intelligent information y from the Payload and when m copies of the intelligent information y are the same,
subsequent processing if m is equal to (M+1); discard M+1−m copies of the intelligent information y which are different from the m copies of the intelligent information y, if m is larger than (M+1)/2 and is smaller than M+1; discard all copies of the intelligent information y, if m is smaller than (M+1)/2.

* * * * *